US00RE42495E

(19) United States
(12) Reissued Patent
Whitten et al.

(10) Patent Number: US RE42,495 E
(45) Date of Reissued Patent: Jun. 28, 2011

(54) INTRUDER DETECTION AND WARNING SYSTEM

(75) Inventors: Stephen Whitten, Harrisonburg, VA (US); Richard Stockstill, San Antonio, TX (US)

(73) Assignee: Communicated Enforcement, LLC, Miami, FL (US)

(21) Appl. No.: 12/700,241

(22) Filed: Feb. 4, 2010

Related U.S. Patent Documents

Reissue of:
(64) Patent No.: 7,327,253
Issued: Feb. 5, 2008
Appl. No.: 11/121,189
Filed: May 4, 2005

(51) Int. Cl.
*G08B 13/00* (2006.01)

(52) U.S. Cl. ..... 340/541; 340/555; 340/556

(58) Field of Classification Search ..... 340/541, 340/541.1, 541.2, 545, 545.2, 545.3, 506, 340/517, 555, 556, 557, 567, 540; 349/152
See application file for complete search history.

(56) References Cited

U.S. PATENT DOCUMENTS

| | | | | | |
|---|---|---|---|---|---|
| 2,256,787 | A | | 9/1941 | Lazar | 240/1.2 |
| 2,700,318 | A | | 1/1955 | Snyder | 88/1 |
| 4,679,034 | A | * | 7/1987 | Kamada | 340/567 |
| 5,299,971 | A | | 4/1994 | Hart | 446/484 |
| 5,309,145 | A | * | 5/1994 | Branch et al. | 340/540 |
| 5,557,173 | A | | 9/1996 | Kuo | 315/158 |
| 5,581,297 | A | * | 12/1996 | Koz et al. | 348/152 |
| 5,786,760 | A | * | 7/1998 | Suzuki et al. | 340/541 |
| 5,892,446 | A | | 4/1999 | Reich | 340/573.1 |
| 5,980,123 | A | | 11/1999 | Heifler | 396/427 |
| 6,079,862 | A | | 6/2000 | Kawashima et al. | 364/167.6 |
| 6,094,135 | A | * | 7/2000 | Sugimoto et al. | 340/541 |
| 6,097,029 | A | | 8/2000 | Downie et al. | 250/330 |
| 6,507,366 | B1 | | 1/2003 | Lee | 348/352 |
| 6,943,685 | B2 | * | 9/2005 | Seo | 340/541 |

* cited by examiner

*Primary Examiner* — Van T. Trieu
(74) *Attorney, Agent, or Firm* — Bacon & Thomas, PLLC

(57) ABSTRACT

An intruder detection and warning system has a plurality of infrared sensors for receiving infrared radiation from respective contiguous areas of premises in need of security. A central illumination unit including a rotatable light is operated to project a beam illuminating a selected one of the contiguous areas of the premises in response to the received infrared radiation by the infrared sensor in the selected area indicating presence of a person in the selected area. Initially a polite message randomly selected from a group of different polite messages is broadcast to request the intruder to leave the premises. When continued presence of the intruder is detected, the light beam is moved away from and then back to the selected area and a further message randomly selected from a group of different more demanding messages is broadcast to demand the intruder to leave the premises. Thus computerized control of the central illumination unit to selectively illuminate areas monitored by respective infrared sensors to detect intruders mimics manual monitoring and security enforcement to more effectively deter intruders. Control of the illumination unit with an associated video camera is passed to a remote monitoring station upon continued failure of the intruder to vacate the premises.

20 Claims, 6 Drawing Sheets

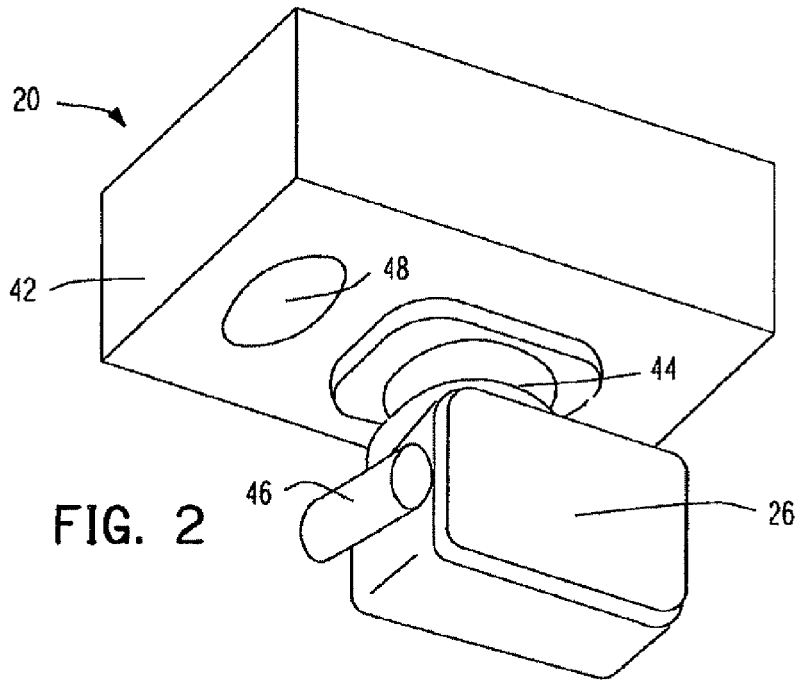
FIG. 2
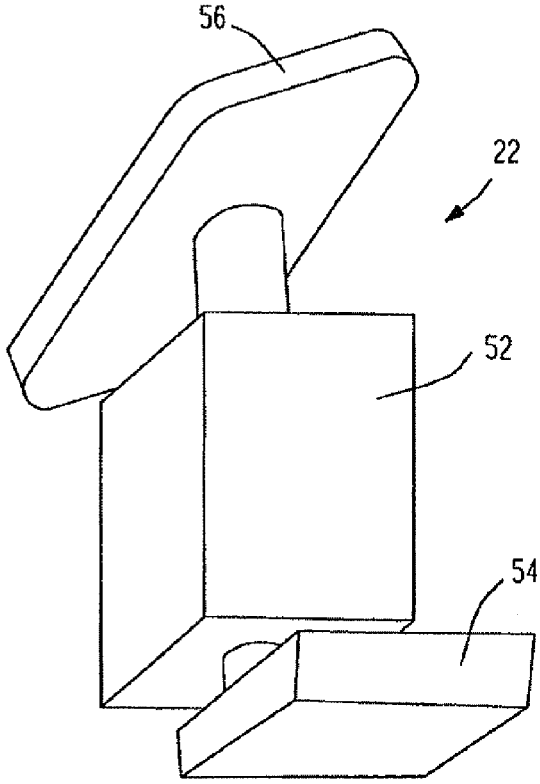
FIG. 3
| GROUP 1 | GROUP 2 |
|---|---|
| MESSAGE-1a | MESSAGE-2a |
| MESSAGE-1b | MESSAGE-2b |
| MESSAGE-1c | MESSAGE-2c |
| -- | -- |
| -- | -- |
FIG. 4

INTRUDER DETECTION AND WARNING SYSTEM

Matter enclosed in heavy brackets [ ] appears in the original patent but forms no part of this reissue specification; matter printed in italics indicates the additions made by reissue.

BACKGROUND OF THE INVENTION

The prior art contains many intruder detection and warning systems including systems employing one or more infrared sensors along with lights, video cameras, video recorders, monitors, warning devices and/or warning messages.

Security of various facilities is an increasing concern. Interception of intruders on premises is an important part of security. Visual monitoring of live video monitors displaying scenes of the premises is often used but fatigue, distractions and other human factors can result in failure to detect intrusions. Infrared detection of intruders is commonly used and can alert or activate visual monitoring. One disadvantage of visual monitoring is the high cost of personnel to perform the visual monitoring. Some systems employ lights, noise and/or warning messages triggered by infrared sensors to deter or scare away intruders but often such lights, noise or warning messages are ineffective as intruders recognize such measures as being generated by computers that can be ignored. Additionally large area premises require employment of multiple intrusion detection and warning systems to cover respective sections of the premises adding to the cost of such prior art systems.

Thus there exists a need for effective intruder interception systems with low operating costs.

BRIEF SUMMARY OF THE INVENTION

The invention is summarized in a intruder detection and warning system having a plurality of infrared sensors for receiving infrared radiation from respective contiguous areas of premises in need of security; logic or computer processing for indicating if the received infrared radiation from each of the contiguous areas is from one or more persons intruding on the premises; an illumination unit including a rotatable light which can be operated to project a beam illuminating a selected one of the contiguous areas of the premises; and a control responsive to the indicating means indicating presence of a person on one of the contiguous areas for operating the illumination unit to project a beam of light on the area where the presence of the person is indicated.

An object of the invention is to provide a relatively low cost intruder detection and warning system that effectively deters many intruders and reduces the need for manual operation to view intrusions.

An advantage of the invention is that relatively simple passive infrared sensors can be spaced about a central illumination and communication unit with automatic operation of the illumination unit mimicking manual operation to direct a light beam to the area where infrared radiation detected by a respective sensor indicates presence of a person.

Additional features enhancing the appearance of manual operation include provision of light beam movement away and back to the area where a person is detected, and random selection of a broadcast message from different messages and/or different voices requesting the intruder to vacate the premises.

Other objects, advantages and features of the invention will be apparent form the following detailed description of the invention and accompanying drawings.

BRIEF DESCRIPTION OF THE DRAWINGS

FIG. 2 is a perspective view of an illumination, camera and communication unit in the system of FIG. 1.

FIG. 3 is perspective view of a personnel infrared sensor unit in the system of FIG. 1.

FIG. 4 is table showing messages stored in the system of FIG. 1.

DETAILED DESCRIPTION OF THE INVENTION

Figure 1:
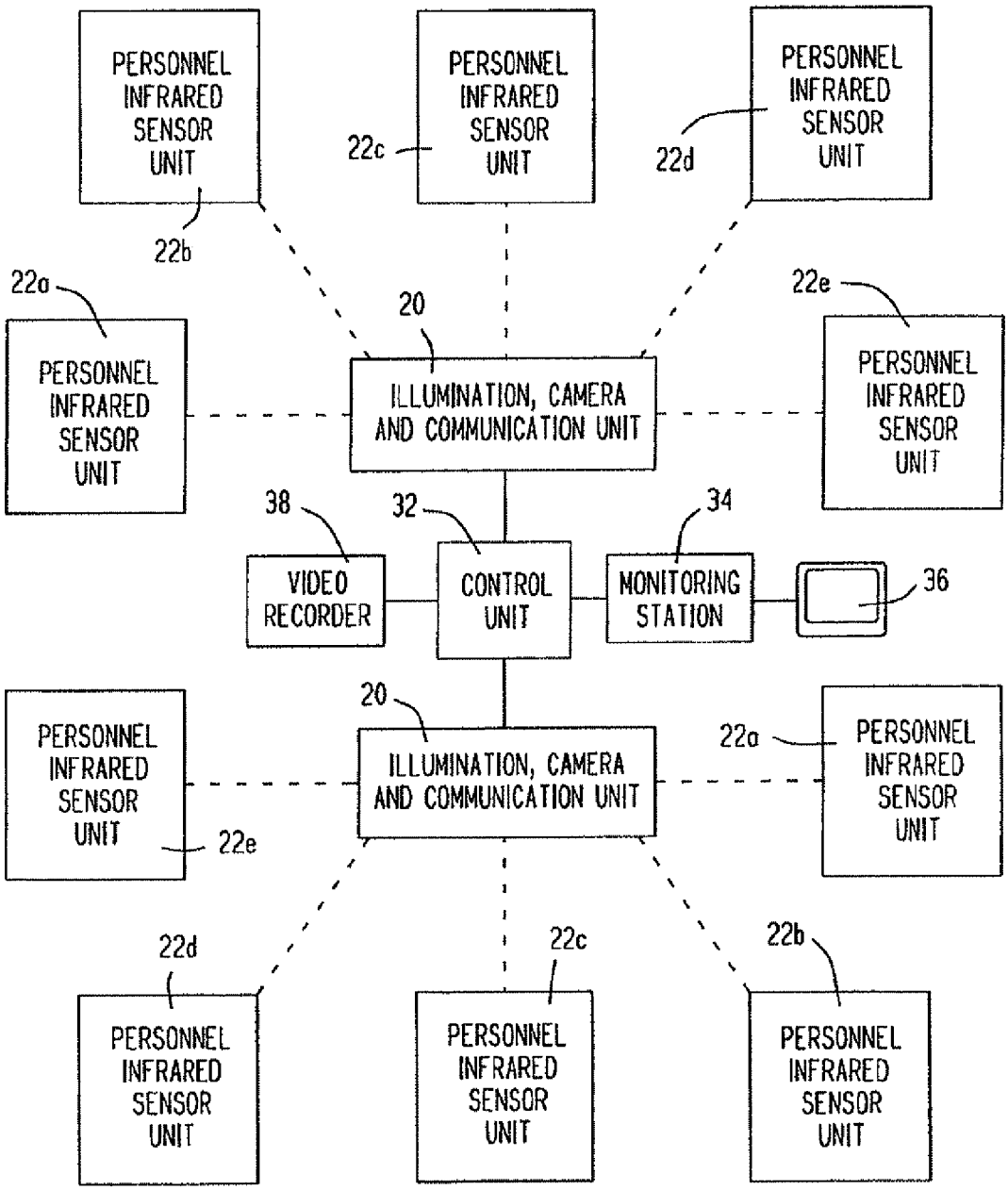
FIG. 1 is a block diagram of an intruder detection and warning system in accordance with the invention.
Figure 5:
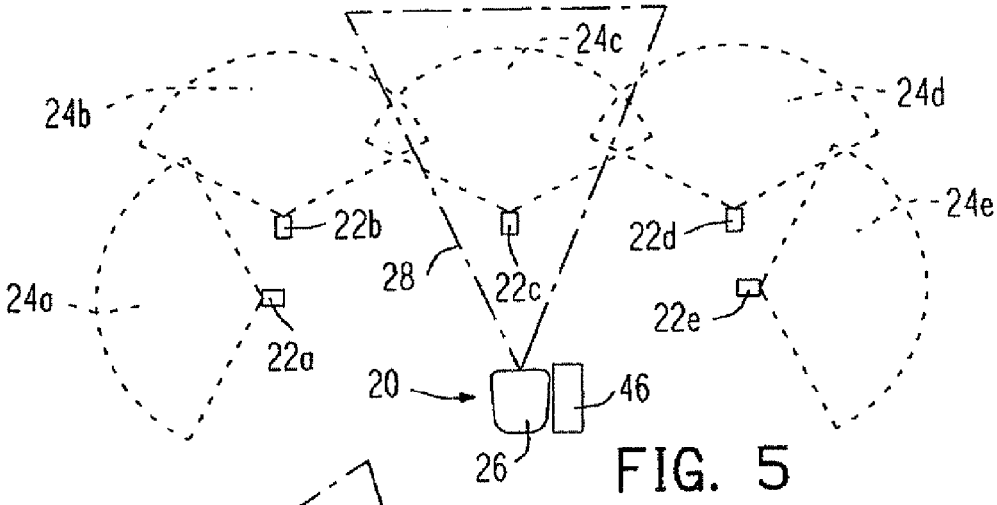
FIG. 5 is a diagram illustrating operation of one portion of the system of FIG. 1 to direct a light beam over a selected area.
Figure 6:
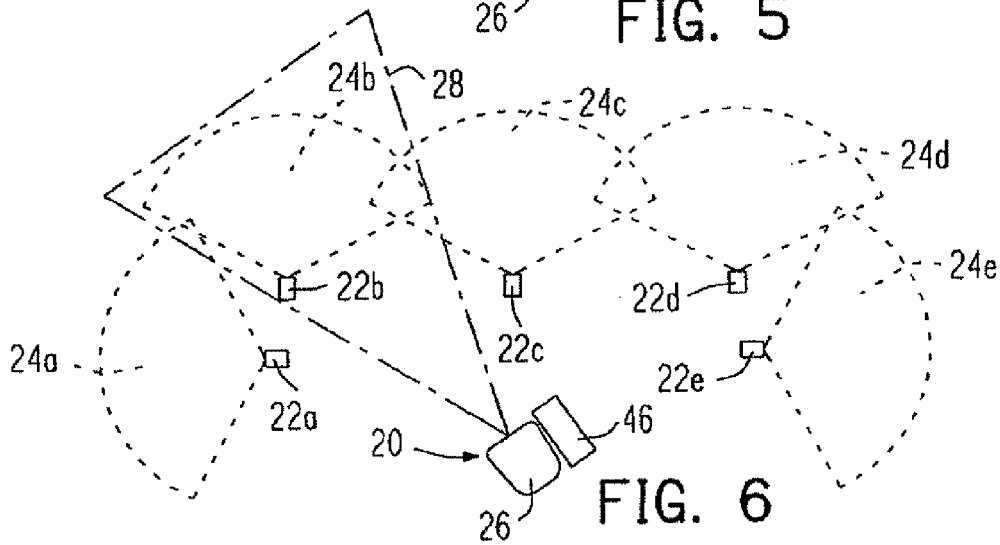
FIG. 6 is a diagram similar to FIG. 5 but with the light beam directed to another selected area.
Figure 7:
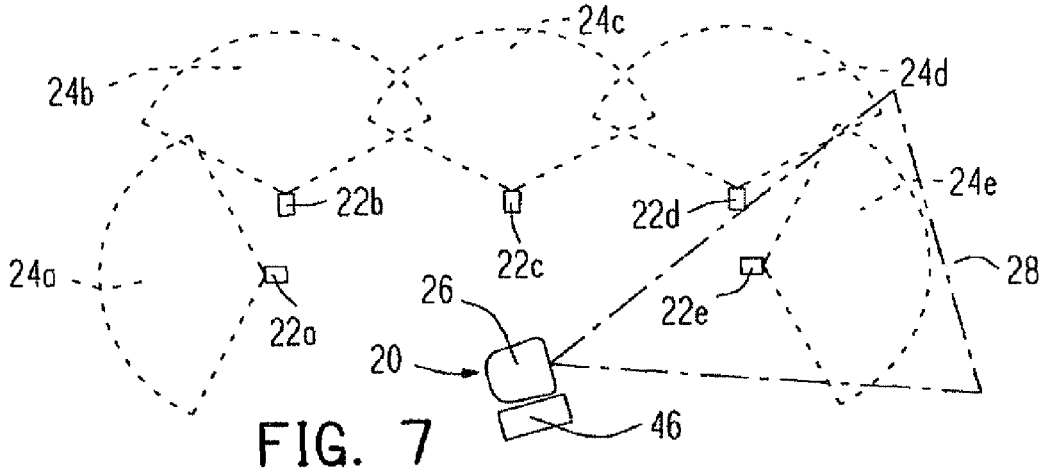
FIG. 7 is a diagram similar to FIGS. 5 and 6 but with the light beam directed to still another selected area.

As shown in FIGS. 1, 5-7, the invention is embodied in a intruder detection and warning system which includes one or more illumination, camera and communication units 20, each of which are disposed in premises centrally with respect to a corresponding plurality of personnel infrared sensor units, such as units 22a, 22b, 22c, 22d and 22e (shown in detail as unit 22 in FIG. 3) deposed to sense the presence of a person or persons in respective contingent areas 24a, 24b, 24c, 24d and 24e of the premises. Particularly as shown in FIGS. 5, 6 and 7, each unit 20 can be operated to rotate a light 26 to project a light beam 28 to selectively illuminate any one of the areas 24a, 24b, 24c, 24d or 24e. For example, FIG. 5 shows light beam 28 illuminating area 24c, FIG. 6 shows light beam illuminating area 24b and FIG. 7 shows light beam 28 illuminating area 24e. Since the rotatable light 26 is disposed centrally in the premises and the light beam is projected onto only a portion of the premises such as the selected one of the areas 24a, 24b, 24c, 24d and 24e, an intruder illuminated by the light beam is given the impression that the intruder detection and warning system is under manual control. Thus an intruder will be deterred from continuing the intrusion.

Additionally the system includes a plurality of stored messages, FIG. 4, such as message1a, message1b, message1c, . . . of group 1 and message2a, message2b, message2c, . . . of group 2. The messages of group 1 are different polite messages (different in that they are recorded by different people and/or have different wording) and the messages of group 2 are different demanding messages. Examples of polite messages are: "You are on private property, please leave" or "You are in a restricted area, please leave," Examples of demanding messages are: "Please leave the area immediately or police will be called" or "You have two minutes to leave the area before you are arrested for trespassing." Typically the demanding message will include a threat of enforcement. When an intruder is first detected on the premises, a randomly selected one of the polite messages of group 1 is broadcast on the premises. If the intruder is still detected after a delay period, such as two to five minutes, a randomly selected one of the demanding messages of group 2 is broadcast on the premises. Often intruders intending to inflict damage, steal goods or spy on premises will make repeat visits to the premises. The broadcast of different messages during repeated visits gives the intruder the impression that the intruder's presence is monitored by security personnel and thus intrusions are further deterred.

Referring back to FIG. 1, the intruder detecting and warning system also includes a control unit 32 connected to the illumination, camera and communication units 20, a remote monitoring facility or center 34 with a video display monitor 36 connected to the control unit 32 and possibly connected to many other intruder detecting and warning systems (not shown), and a video recorder for recording video frames viewed by the unit 20. Typically the control unit 32 and the video recorder are mounted in a building (not shown) or other secure enclosure while units 20 and 22 are mounted outside on posts, outside portions of buildings, etc. Data from and to personnel infrared sensor units 22 is transmitted data by wireless or radio links to the unit 20. Cables connect the units 20 to the control unit 32 for transmitting the data from the infrared sensors along with light position and video signals. Control and message signals from the control unit 32 are transmitted by cables to the illumination, camera and communications units. The remote monitoring facility 34 is connected by cable or by dedicated or dial-up telephone lines to the control unit 34.

Alternatively, the personnel infrared sensor units 22 can be connected directly by cables in a star arrangement (not shown) or a ring arrangement (not shown) to the control unit 32.

Referring to FIG. 2, the illumination, camera and communication unit 20 has a housing 42 which can be mounted on a support (not shown), such as under eaves of a building or on a crossbar on a post. The rotatable light 26 includes a rotating and pivoting mounting 44 containing internal motors which rotate the light 26 in a horizontal plane and pivot the light 26 in a vertical plane. The light 26 is a spot light which projects a beam such, as a 400,000 candle-power beam, sufficient to illuminate a selected area in the premises under security while leaving non-selected areas non-illuminated. Preferably rotary position sensors such as potentiometers (not shown) provide signals indicating the horizontal and vertical rotary positions of the light 26 to the control unit 32. A video camera such as a color CCD video camera 46 is mounted on the housing of the light 26 for being rotated and pivoted with the light. The camera 46 has motorized zoom control as well as automatic and motorized focusing control. Additional a speaker and microphone arrangement 48 is mounted on the housing 42 for broadcasting messages in the premises and receiving responses for transmission to the monitoring station 34. The housing 42 contains electronic circuitry for handling radio transmissions to and from the units 22, for handling cable transmissions to and from the control unit 32, for processing light and camera horizontal and vertical position signals, for providing signals to operate the light positioning motors, for providing signals operating the zoom and focus controls of the camera 46, for providing amplified audio signals to the speaker and receiving and processing audio signals from the microphone.

The personnel sensor unit 22, FIG. 3, includes a housing 52 which can be mounted on a post (not shown) and which supports a passive infrared personnel sensor 54 and a solar panel 56. Typically the sensor 54 includes an infrared array sensor (not shown) with optics for directing infrared from arc portions of the viewed field onto respective members of the array. The housing contains a rechargeable battery (not shown) which is recharged by the solar panel and contains electronic circuitry for handling radio transmission to and from the unit 20, for processing signals from the passive infrared sensor 54 and for controlling the charging of the battery.

Figure 8:
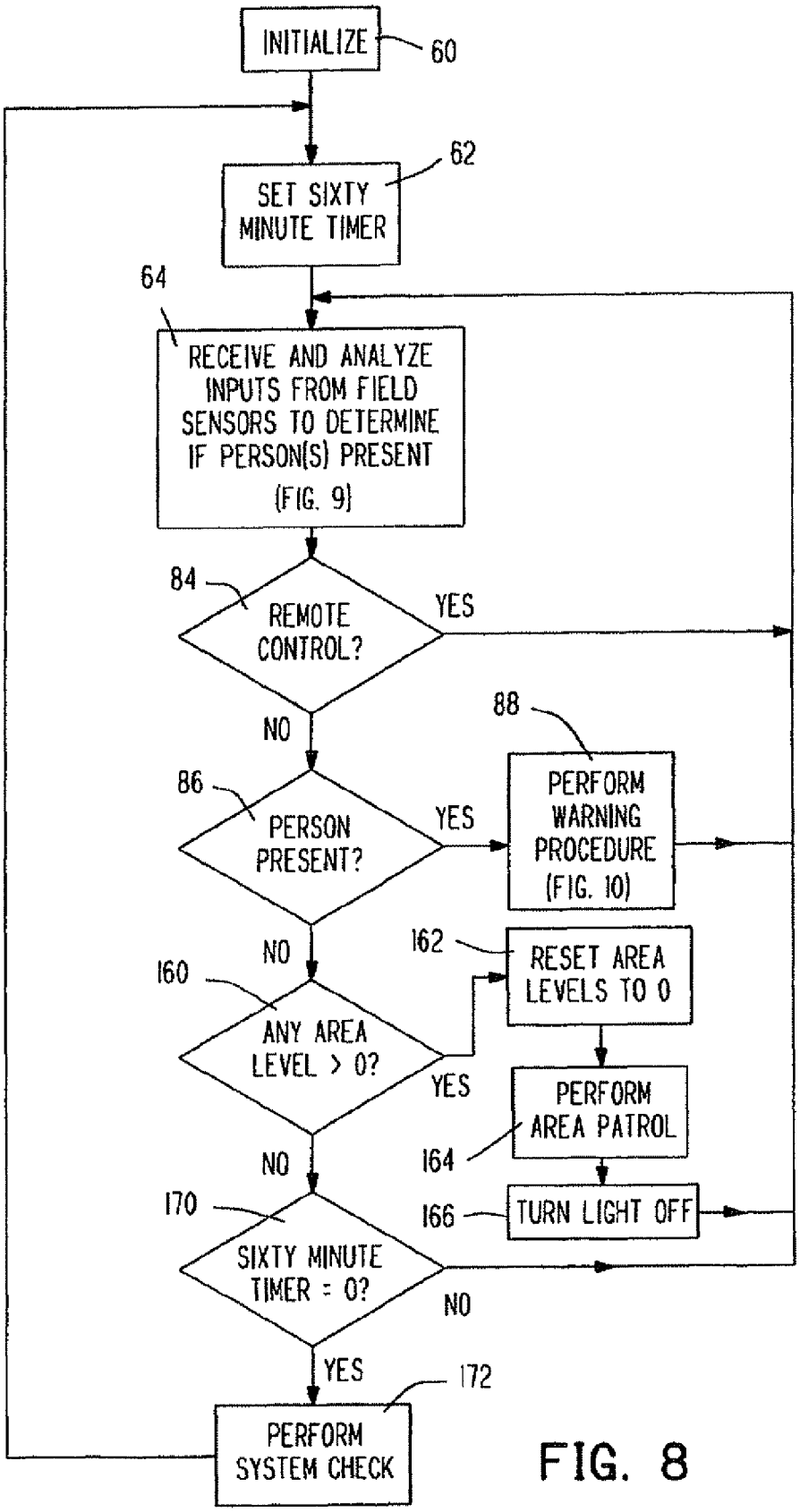
FIG. 8 is a step diagram of a main program employed to control the illumination, camera and communication unit of FIGS. 1 and 2.

A main program, FIG. 8, employed by a microprocessor in the control unit 32 controls operation of the light and camera positioning motors and the message broadcasting facilities in the illumination and communication unit 20. At startup step 60 the system is initialized and then in step 62 a timer such as a sixty minute timer is set to the desired minimum period between system checks. In step 64 the procedure of FIG. 9 is called to analyze inputs from the field sensors to determine if one or more persons are present in the areas monitored by personnel infrared sensor units 22 associated with the unit 20, such as sensor units 22a, 22b, 22c, 22d and 22d monitoring respective areas 24a, 24b, 24c, 24d and 24e when there are five such sensors.

Figure 9:
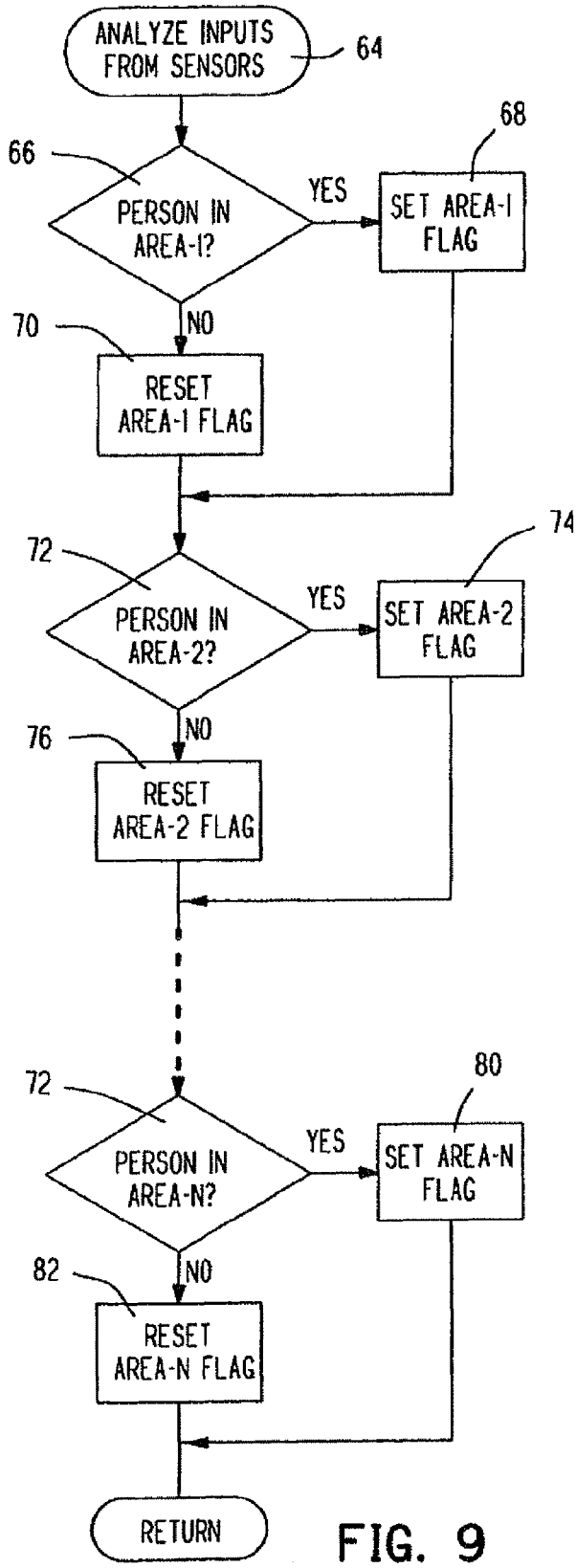
FIG. 9 is a step diagram of an analyze sensor inputs procedure of the program of FIG. 8.

In step 66 of FIG. 9 it is determined if a person is present in area-1. The analysis of the signal(s) generated by infrared sensors to determine the presence of a person can be either by logic or computer processing in the passive sensing unit 22 monitoring area-1 or in the control unit 32 based upon infrared readings transmitted to control unit 32. The presence of a person in the viewed field is determined based upon signal strength, duration, movement, etc. If step 66 is true then area-1 flag is set in step 68; otherwise the area-1 flag is reset in step 70. The procedure for area-1 represented by steps 66, 68 and 70 is repeated for each of the areas associated with the unit 20; for example steps 72, 74 and 76 similar to respective steps 66, 68 and 70 are performed for area-2 and steps 78, 80 and 82 similar to steps 66, 68 and 70 are performed of area-N. Where the passive sensing units 22 sense arrays of arc increments, the angular location of the person within each area can be determined. When two adjacent areas indicate the present of a person in angular areas which overlap, a determination that only one person is present in the overlapping portions of the areas being viewed. Furthermore the overlapped area can be designated as a separate area, for example area-6 can be the overlapping portions of area-1 and area-2 and the determination of a person within this overlapped area would result in the resetting of area-1 and area-2 flags and the setting of area-6 flag. This would enable the search light to centered on the overlapped area.

After returning to the main program of FIG. 8, step 84 determines if the unit 20 is controlled by the remote monitoring station 34. If true, the program continues to cycle through step 64 to determine presence of one or more intruders and present the results to the monitoring station. If step 84 is false, step 86 determines if any person has been found on the premises by procedure 64 and, if true, the warning procedure of FIG. 10 is called in step 88.

Figure 10:
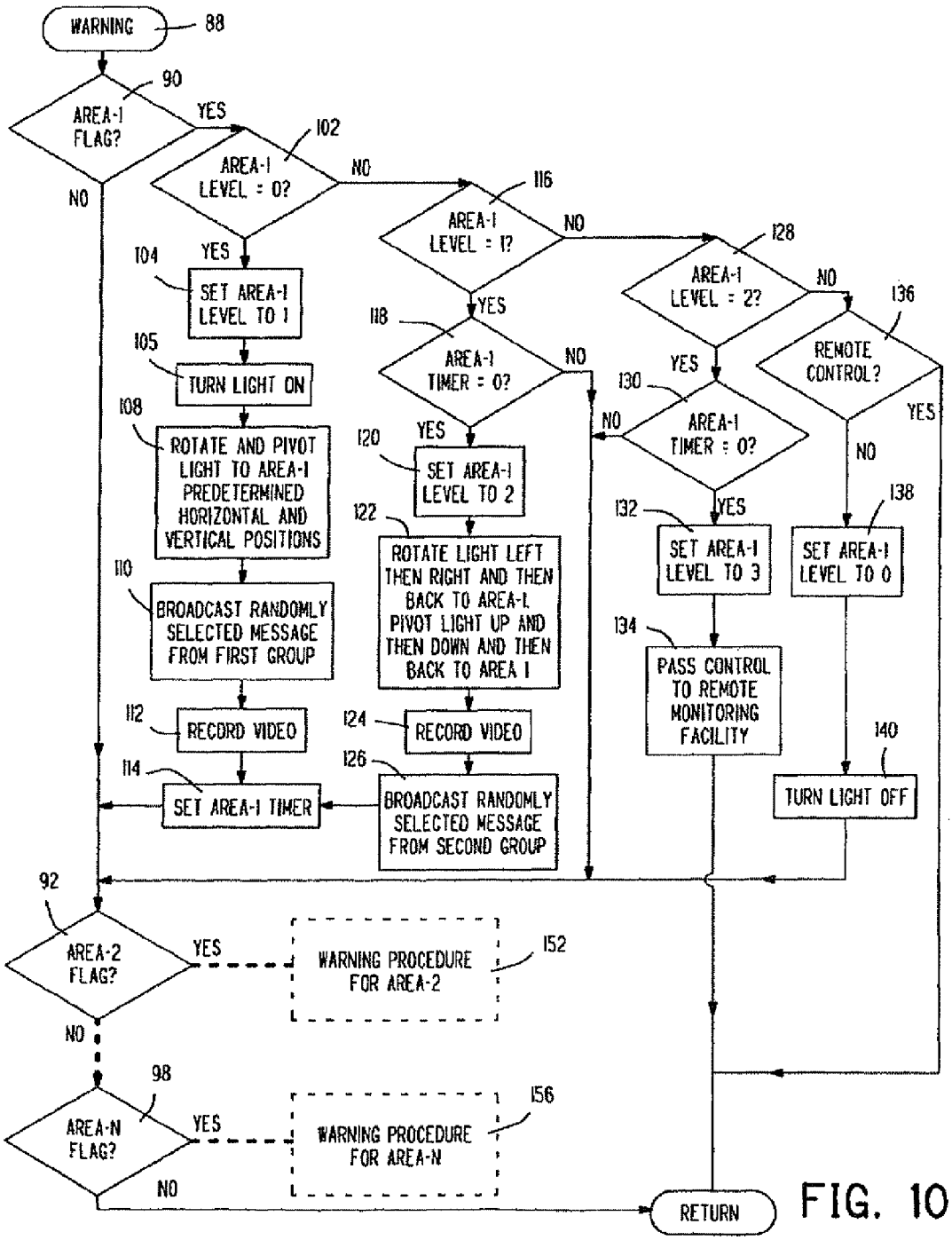
FIG. 10 is a step diagram of warning procedure of the program of FIG. 8.

In the warning procedure of FIG. 10, the spot light is directed successively to all areas where a person or intruder has been found in the procedure 64. More particularly, step 90 determines if area-1 flag is set indicating a person is in area-1. When no person is in area-1, the area-1 flag has not been set by the procedure 64 and thus procedure 88 advances to step 92 which determines if the area-2 flag is set. The procedure continues to look for set area flags of all the areas through area-N flag in step 98 whereupon a false returns the procedure to the main program of FIG. 8.

When an area flag is found set, such as area-1 flag being found set in step 90, the procedure directs the spot light to that flagged area and to broadcast one or more warnings to the intruder. For the example of area-1 flag being set, step 102 determines if area-1 level is set to initial state 0. If true, step 104 sets the area-1 level to 1, step 106 turns the light 26 on, and step 108 rotates and pivots the light 26 to illuminate area-1. The horizontal and vertical positions needed for the light 26 to illuminate area-1 are predetermined and stored in a non-volatile memory for being recalled and used to position the light. Then in step 110, a randomly selected message from the first group of messages is broadcast from the speaker 48. This first message is a polite message requesting the intruder to leave the area. The recording of one or more video frames in the video recorder 38 is performed in step 112 and an area-1 timer is set in step 114 to a value equal to a time period sufficient to allow the intruder to leave area-1.

When step 102 is false, i.e., after the initial movement of the spot light and broadcast of a polite warning to the intruder, step 116 determines if the area-1 level is now 1, and if true step 118 determines if the intruder has had sufficient time to leave area-1 by determining if area-1 timer has lapsed. When true, step 120 sets area-1 level to 2. Next, step 122 rotates the light 26 to the left from area-1, to the right past area-1 and then back to area-1, and pivots the light 26 down from area-1, up past area-1 and the back to area-1. This rotation of the light is designed to give the appearance of the light being operated by manual controls to deter further intrusion. Step 124 records one or more additional video frames in the video recorder 38 and step 126 broadcasts a second message selected from the second group of messages followed by setting the area-1 timer again in step 114. The second message is more demanding then the first message and may include a threat of enforcement, such as a threat to call the police or have the intruder arrested.

The program proceeds to step 128 when step 116 is false wherein it is determined of the area-1 level is 2. If true, step 130 determines of enough time has elapsed for the intruder to leave the premises after the second warning message by determining if the area-1 timer is 0. When true, step 132 sets the area-1 level to 3 and step 134 passes control to the remote monitoring station 34. Further automatic operation of the illumination, camera and communication unit 20 is prevented by step 84 of the main program. After remote control is discontinued, step 136 will be false causing the program to proceed to step 138 where the area-1 level is set back to 0 and then to step 140 where the light is turned off.

The procedure of FIG. 10 described above by the even numbered steps 102 through 140 is a warning procedure for an intruder detected in area-1. If any of steps 90, 118 and 130 are false or after completion of steps 114 and 140, the warning procedure advances to step 150 where it is determined if area-2 flag is set to indicate that a person is in area-2. When true a warning procedure 152 having steps similar to the even numbered steps 102 through 140 is performed for area-2. Similar procedures are performed for each of the areas area-1 through area-N such as indicated by warning procedure 156 for area-N.

It is noted that when intruders are sensed in two or more areas, the light beam is successively moved to each of the areas where intruders are found. Thus intrusions by several people will not result in failure to detect and warn any of the several intruders.

After each cycle through the warning procedure of FIG. 10, the main program from step 88 returns to step 64 so that the system continues to detect the presence of intruders in any of the areas.

When all the areas are found clear of intruders, the program proceeds to step 160 when it is determined if any area level is greater than zero. If true, step 162 resets all area levels back to zero, step 164 performs an area patrol by horizontally sweeping the light beam through all the areas at two or more successive vertical positions, and step 166 then turns the light off. If step 160 is false, step 170 determines if the sixty minute timer is 0 and if true, proceeds to step 172 where a system check is preformed to determine if all components are operating properly. After the system check, the program returns to step 62 to again set the sixty minute timer.

The foregoing description and accompanying drawings are only illustrative of the invention and many variations, modification and changes in detail can be made without departing from the scope and spirit of the invention.

The invention claimed is:

1. An intruder detection and warning system comprising:

a [plurality of infrared sensors] *personnel sensor* for [receiving infrared radiation from] *monitoring* respective [contiguous] *different* areas of premises in need of security;

*indicating* means for [indicating if the received infrared radiation] *analyzing inputs* from each of the [contiguous] areas [is from] *to determine if the presence of* one or more persons intruding on the premises *is indicated*;

an illumination unit including a rotatable light which can be operated to project a beam illuminating a selected one of the [contiguous] *different* areas of the premises; and illumination operating means, responsive to the indicating means indicating presence of a person in one of the [contiguous] *different* areas, for operating the illumination unit to project a beam of light on the selected one area where the presence of the person is indicated, to illuminate the selected one area.

2. An intruder detection and warning system as claimed in claim 1 *comprising a plurality of personnel sensors,* wherein each of the plurality of [infrared] *personnel* sensors is a passive infrared sensor.

3. An intruder detection and warning system as claimed in claim 1 further including message means responsive to the indicating means indicating presence of a person for broadcasting a message on the premises requesting the intruder to leave the premises.

4. An intruder detection and warning system as claimed in claim 3 wherein the illumination operating means, responsive to the indicating means indicating presence of a person a period of time after the message broadcast, operates the illumination unit to simulate manual control by moving the light beam away from the area where the presence of the person is indicated and then back to the area where the presence of the person is indicated.

5. An intruder detection and warning system as claimed in claim 4 wherein the second illumination operating means successively rotates the light and pivots the light to move the light beam successively horizontally and vertically away from the area where the presence of the person is indicated.

6. An intruder detection warning system as claimed in claim 4 further including a memory and, stored in the memory, a plurality of different messages and wherein the message means randomly selects a message from the plurality of different messages to broadcast on the premises.

7. An intruder detection and warning system as claimed in claim 6 wherein the plurality of messages include first and second groups of messages, the first group of messages being different messages which politely request the intruder to leave the premises and the second group of messages being different messages which demand the intruder to leave the premises with a threat of enforcement; and wherein the message means includes first message means responsive to the indicating means initially indicating presence of a person on the premises for broadcasting a first message randomly selected from the first group of messages, and second message means responsive to continued indication of the presence of the person on the premises for broadcasting a second message randomly selected from the second group of messages.

8. An intruder detection and warning system as claimed in claim 7 further including a remote monitoring station and means, responsive to further continued indication of the presence of the person on the premises after operation of the illumination operating means and the second message means, for passing control of the illumination means to the remote monitoring station.

9. An intruder detection and warning system as claimed in claim 8 further including a video camera mounted on the rotatable light for enabling the remote monitoring station to view the premises.

10. An intruder detection and warning system as claimed in claim 3 further including a memory and, stored in the memory, a plurality of different messages and wherein the message means randomly selects a message from the plurality of different messages to broadcast on the premises.

11. An intruder detection and warning system as claimed in claim 10 wherein the plurality of messages include first and second groups of messages, the first group of messages being different messages which politely request the intruder to leave the premises and the second group of messages being different messages which demand the intruder to leave the premises with a threat of enforcement; and wherein the message means includes first message means responsive to the indicating means initially indicating presence of a person on the premises for broadcasting a first message randomly selected from the first group of messages, and second message means responsive to continued indication of the presence of the person on the premises for broadcasting a second message randomly selected from the second group of messages.

12. An intruder detection and warning system as claimed in claim 1 further comprising a memory and, stored in the memory, horizontal light positions predetermined for each of the [contiguous] *different* areas; and wherein the first illumination operating means retrieves the horizontal light position predetermined for the selected one area and selectively rotates the light horizontally to the horizontal position predetermined for illumination of the selected one area.

13. An intruder detection and warning system as claimed in claim 12 wherein the illumination unit is a spotlight having sufficient candle-power to illuminate the selected area.

14. An intruder detection and warning system as claimed in claim 12 wherein the illumination unit illuminates the selected one area while leaving non-selected [contiguous] *different* areas non-illuminated.

15. An intruder detection and warning system as claimed in claim 1 further comprising a memory and, stored in the memory, horizontal and vertical light positions predetermined for each of the [contiguous] *different* areas; and wherein the first illumination operating means retrieves the horizontal and vertical light positions predetermined for the selected one area and pivots the light vertically to the vertical position predetermined for illumination of the selected one area and rotates the light horizontally to the horizontal position predetermined for illumination of the selected one area.

16. An intruder detection and warning system as claimed in claim 15 wherein the illumination unit is a spotlight having sufficient candle-power to illuminate the selected *one* area.

17. An intruder detection and warning system as claimed in claim 15 wherein the illumination unit illuminates the selected one area while leaving non-selected [contiguous] *different* areas non-illuminated.

18. An intruder detection and warning system as claimed in claim 1 wherein the illumination unit is a spotlight having sufficient candle-power to illuminate the selected *one* area.

19. An intruder detection and warning system as claimed in claim 1 wherein the illumination unit illuminates the selected one area while leaving non-selected [contiguous] *different* areas non-illuminated.

20. An intruder detection and warning system according to claim 1 wherein the illumination operation means mimics manual control by rotating the light in a first direction past the selected one area and then in a second direction back to the selected one area.

* * * * *

UNITED STATES PATENT AND TRADEMARK OFFICE

CERTIFICATE OF CORRECTION

PATENT NO. : RE42,495 E
APPLICATION NO. : 12/700241
DATED : June 28, 2011
INVENTOR(S) : Stephen Whitten et al.

It is certified that error appears in the above-identified patent and that said Letters Patent is hereby corrected as shown below:

Title page, Item (57) ABSTRACT, please replace the Abstract with the following:

--An intruder detection and warning system has a plurality of sensors for receiving signals from respective areas of a premises. A central illumination unit including a rotatable light projects a beam to illuminate a selected area of the premises in response to the signal received from a sensor, indicating presence of a person in that area. Initially a polite message, randomly selected from a group of different polite messages, requests the intruder to leave. When continued presence of the intruder is detected, the light beam is moved away from and then back to the same area and a further, more demanding message is broadcast to demand that the intruder leave the premises. Thus, computerized control of the central illumination unit mimics manual monitoring to more effectively deter intruders.--

Signed and Sealed this
First Day of November, 2011

David J. Kappos

David J. Kappos
*Director of the United States Patent and Trademark Office*